United States Patent [19]

Ford et al.

[11] 4,297,203

[45] Oct. 27, 1981

[54] APPARATUS FOR THE CATALYTIC CRACKING OF HYDROCARBONS

[75] Inventors: William D. Ford, Downers Grove, Ill.; Michael J. Clark, Chesterton, Ind.

[73] Assignee: Standard Oil Company (Indiana), Chicago, Ill.

[21] Appl. No.: 139,894

[22] Filed: Apr. 14, 1980

[51] Int. Cl.³ .................... C10G 11/18; C10G 51/06
[52] U.S. Cl. ......................... 208/74; 208/77; 208/78; 208/113; 422/142
[58] Field of Search .................... 208/74–78, 208/113; 422/141, 142

[56] References Cited

U.S. PATENT DOCUMENTS

| | | | |
|---|---|---|---|
| 2,767,126 | 10/1956 | Rice | 208/74 |
| 2,956,003 | 10/1960 | Marshall et al. | 208/74 |
| 3,886,060 | 5/1975 | Owen | 208/74 X |
| 4,067,798 | 1/1978 | Hauschildt et al. | 208/92 |
| 4,116,814 | 9/1978 | Zahner | 208/78 |
| 4,138,219 | 2/1979 | Colvert et al. | 422/144 |
| 4,220,623 | 9/1980 | Jahnke et al. | 422/144 |

Primary Examiner—Delbert E. Gantz
Assistant Examiner—G. E. Schmitkons
Attorney, Agent, or Firm—Richard A. Kretchmer; William T. McClain; William H. Magidson

[57] ABSTRACT

An apparatus for the fluidized catalytic cracking of hydrocarbons comprising two independent transfer line reactors, each of which is associated with an independent cyclone separation system and wherein the cyclone separation systems are located within a common reactor vessel. The apparatus is suitable for use in the simultaneous fluidized catalytic cracking of dissimilar hydrocarbon feedstocks without commingling either the feedstocks or the products therefrom.

14 Claims, 1 Drawing Figure

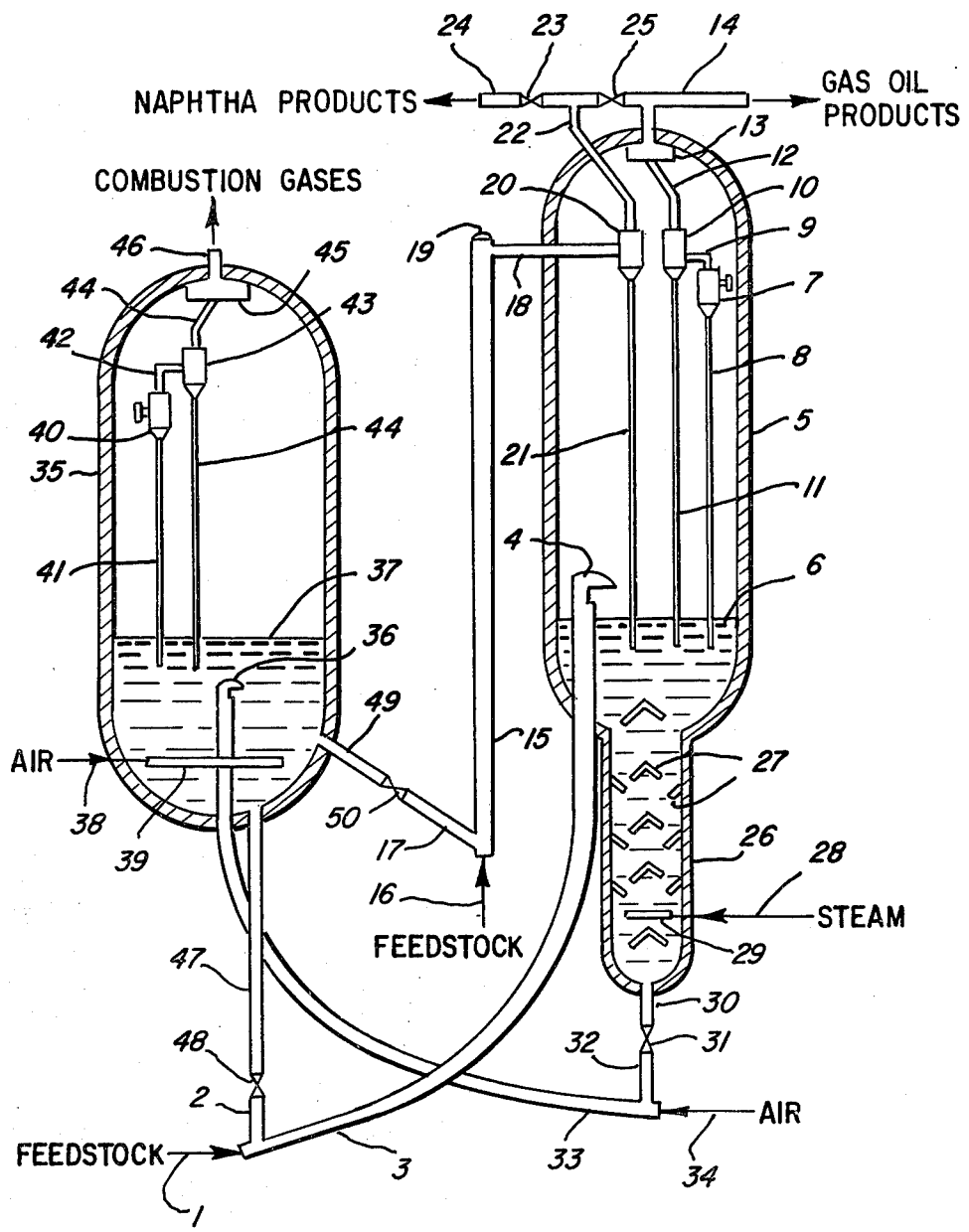

APPARATUS FOR THE CATALYTIC CRACKING OF HYDROCARBONS

BACKGROUND OF THE INVENTION

1. Field of the Invention

This invention relates to an apparatus and process for the catalytic cracking of hydrocarbons. The apparatus comprises two independent transfer line reactors, each of which is associated with an independent cyclone separation system and wherein the cyclone separation systems are located within a common reactor vessel. More particularly, the invention relates to an improved apparatus which can be used for the simultaneous fluidized catalytic cracking of dissimilar hydrocarbon feedstocks without commingling either the feedstocks or the products therefrom.

2. Description of the Prior Art

Catalytic cracking of heavy petroleum fractions is one of the major refining operations employed in the conversion of crude petroleum oils to useful products such as the fuels which are utilized by internal combustion engines. In fluidized catalytic cracking processes, high molecular weight hydrocarbon liquids and vapors are contacted with hot, finely divided, solid catalyst particles, either in a fluidized bed reactor or in an elongated transfer line reactor, and maintained at an elevated temperature in a fluidized or dispersed state for a period of time sufficient to effect the desired degree of cracking to lower molecular weight hydrocarbons of the kind typically present in motor gasoline and distillate fuels.

Products from the catalytic cracking of heavy petroleum fractions have been of suitable quality for direct use as gasoline blending components. However, the recent trend toward lower sulfur and lead levels in gasoline has made some form of reprocessing of the catalytic cracking product desirable. In addition, requirements for additional sources of light olefins for either chemical feedstock or alkylate feedstock and of light aromatics for chemical feedstock have also made reprocessing desirable.

U.S. Pat. No. 3,928,172 to Davis et al. discloses a method for improving the quality and volatility of a refinery gasoline pool which comprises catalytically cracking a gas oil, fractionating the resulting products, and recracking the heavy naphtha which is obtained from the fractionation. This patent discloses a catalytic cracking apparatus which comprises two independent vertical transfer line reactors wherein one transfer line reactor is for gas oil cracking and the other is for heavy naphtha recracking. Each transfer line reactor is directly connected to a separate cyclone separation system, and the hydrocarbon products flow from each cyclone system to a separate product recovery system to prevent the mixing of products from the two reactors. The spent catalyst from each cyclone separation system flows downwardly through dip-legs and into a bed of spent catalyst within a stripping vessel. The cyclone system for the gas oil reactor is located within the stripping vessel, whereas the cyclone system for the heavy naphtha reactor is located outside of the stripping vessel and spent catalyst from it flows downwardly through a dip-leg which terminates in the stripping vessel and is positioned at an angle of about 45° from vertical.

The apparatus which is disclosed by the Davis et al. patent is unsatisfactory, however, in many respects. When a cyclone dip-leg is positioned at a substantial angle from vertical, as is required by the Davis et al. disclosure, the downward flowing catalyst causes a relatively rapid and highly undesirable erosion of the lower interior surface of the dip-leg which can ultimately result in the formation of a hole in the dip-leg wall. Such a hole would, of course, require that the process unit be shut down if it is formed at a location which permits hydrocarbons and catalyst to escape from the process unit. In addition, Davis et al. fail to disclose or suggest any means which would permit the products from both transfer line reactors to be commingled and sent to a single product recovery system in the event that this should become either necessary or desirable, for example, as a consequence of equipment failure or a need to process an identical feedstock in both transfer line reactors. Further, Davis et al. fail to teach or suggest either the possibility or desirability of placing both cyclone systems within a single main reactor vessel.

U.S. Pat. No. 4,067,798 to Hauschildt et al. also discloses a method for improving the quality of a refinery gasoline pool. Hauschildt et al. teach that a feedstock comprising from 80 to 100 volume percent of a hydrocarbon fraction containing at least 25 weight percent of mono-aromatic hydrocarbons and boiling in the boiling range of heavy gasoline in combination with from 0 to 20 volume percent of a vaporizable hydrocarbon fraction can be catalytically cracked to produce a product having an increased low molecular weight olefin and mono-aromatic content, a substantially reduced sulfur content, and a high octane rating relative to the feedstock. It is disclosed that the fraction comprising from 80 to 100 volume percent of the feedstock is preferably a catalytic cracking product. It is also disclosed that the feedstock must be subjected to catalytic cracking in the absence of any other feedstock and the products must be isolated separately from any other products. Although the Hauschildt et al. process can be carried out using conventional apparatus for the catalytic cracking of hydrocarbons, there is a need for an apparatus which will permit the more efficient practice of this process.

SUMMARY OF THE INVENTION

This invention is directed to an improved fluidized catalytic cracking system comprising in combination a spent catalyst stripper, a spent catalyst regenerator, and multiple reactors. The improvement of the present invention involves apparatus for the fluidized catalytic cracking of hydrocarbon feed-stocks in multiple reactors comprising: (a) a first elongated transfer line reactor which is adapted for the fluidized catalytic cracking of hydrocarbon feed-stock, having an upper and lower end, said lower end having both a regenerated catalyst inlet means and a hydrocarbon feedstock inlet means; (b) a reactor vessel communicating with and enclosing the upper end of said first transfer line reactor; (c) an outlet means for removing spent catalyst from the lower portions of said vessel; (d) a first cyclone separation system located within said vessel and adapted to separate catalyst particles from vapors, which comprises at least one cyclone gas-solids separation means having a dip-leg depending therefrom; (e) a vapor outlet means connected to said first cyclone separation system; (f) a second elongated transfer line reactor which is adapted for the fluidized catalytic cracking of hydrocarbon feedstock, having an upper and lower end, said lower end having both a regenerated catalyst inlet means and a hydrocarbon feedstock inlet means; (g) a separate conduit leading to each hydrocarbon feedstock inlet means, whereby the same or different feedstocks can be conveyed to each transfer line reactor; (h) a second cyclone separation system located within said vessel, directly connected by an inlet means to the upper end of said second transfer line reactor, and adapted to separate the mixture of catalyst particles and vapors which is discharged from said second transfer line reactor, wherein said second cyclone separation system comprises at least one cyclone gas-solids separation means having a dip-leg depending therefrom, and whereby the vapors from said second transfer line reactor are substantially separated and prevented from entering said vessel and catalyst from the second transfer line reactor is separated and passed into said vessel; (i) a vapor outlet means connected to the second cyclone separation system; and (j) a separate conduit leading from the vapor outlet means associated with each cyclone separation system, whereby the vapors from each vapor outlet means can be conveyed to a separate product recovery system.

One embodiment of the invention is a process for the fluidized catalytic cracking of hydrocarbon feed-stocks in multiple reactors which comprises: (a) passing a fluidized mixture of catalyst particles and a first hydrocarbon feedstock upwardly through a first elongated transfer line reactor under effective cracking conditions, whereby catalytic cracking of said first hydrocarbon feedstock is effected; (b) passing a fluidized mixture comprising catalyst particles and hydrocarbon vapors, including cracked hydrocarbon products, from said first transfer line reactor to a reactor vessel communicating with and enclosing the upper end of said first transfer line reactor; (c) passing hydrocarbon vapors and entrained catalyst particles from said vessel to a first cyclone separation system adapted to separate catalyst particles from vapors, which comprises at least one cyclone gas-solids separation means having a dip-leg depending therefrom whereby entrained catalyst particles are separated from the vapors and returned to said vessel; (d) passing said vapors from said first cyclone separation system to a product recovery zone; (e) passing a fluidized mixture of catalyst particles and a second hydrocarbon feedstock upwardly through a second elongated transfer line reactor under effective cracking conditions, whereby catalytic cracking of the second hydrocarbon feedstock is effected, and wherein said first and second hydrocarbon feedstocks are the same or different; (f) passing a fluidized mixture comprising catalyst particles and hydrocarbon vapors, including cracked hydrocarbon products, from an upper portion of said second transfer line reactor to a second cyclone separation system located within said vessel, directly connected by an inlet means to the upper end of said second transfer line reactor, and adapted to separate the mixture of catalyst particles and vapors which is discharged from said second transfer line reactor, wherein said second cyclone separation system comprises at least one cyclone gas-solids separation means having a dip-leg depending therefrom, and whereby the vapors from said second transfer line reactor are substantially separated and prevented from entering said vessel and catalyst from the second transfer line reactor is separated and passed into said vessel; and (g) passing said vapors from said second cyclone separation system to said product recovery zone and recovering therein cracked hydrocarbon products from said vessel and said second transfer line reactor.

Another embodiment of the invention is a process for the fluidized catalytic cracking of hydrocarbon feedstocks in multiple reactors which comprises: (a) passing a fluidized mixture of catalyst particles and heavy hydrocarbon feedstock upwardly through a first elongated transfer line reactor under effective cracking conditions, whereby catalytic cracking of the heavy hydrocarbon feedstock is effected; (b) passing a fluidized mixture comprising catalyst particles and hydrocarbon vapors, including cracked hydrocarbon products, from said first transfer line reactor to a reactor vessel communicating with and enclosing the upper end of said first transfer line reactor; (c) passing hydrocarbon vapors and entrained catalyst particles from said vessel to a first cyclone separation system adapted to separate catalyst particles from vapors, which comprises at least one cyclone gas-solids separation means having a dip-leg depending therefrom whereby entrained catalyst particles are separated from the vapors and returned to said vessel; (d) passing said vapors from said first cyclone separation system to a first product recovery zone and recovering a hydrocarbon fraction comprising at least 25 weight percent mono-aromatic hydrocarbons and boiling in the range from about 110° to about 260° C.; (e) passing a fluidized mixture of catalyst particles and a naphtha feedstock upwardly through a second elongated transfer line reactor under effective cracking conditions, whereby catalytic cracking of the naphtha feedstock is effected, and wherein said naphtha feedstock comprises at least a portion of the hydrocarbon fraction from step (d) in combination with from 0 to 20 volume percent of another vaporizable hydrocarbon fraction; (f) passing a fluidized mixture comprising catalyst particles and hydrocarbon vapors, including cracked hydrocarbon products, from an upper portion of said second transfer line reactor to a second cyclone separation system located within said vessel, directly connected by an inlet means to the upper end of said second transfer line reactor, and adapted to separate the mixture of catalyst particles and vapors which is discharged from said second transfer line reactor, wherein said second cyclone separation system comprises at least one cyclone gas-solids separation means having a dip-leg depending therefrom, and whereby the vapors from said second transfer line reactor are substantially separated and prevented from entering said vessel and catalyst from the second transfer line reactor is separated and passed into said vessel; and (g) passing said vapors from said second cyclone separation system to a second product recovery zone and recovering therein the cracked hydrocarbon products from said second transfer line reactor.

An object of this invention is to provide an improved apparatus for the simultaneous fluidized catalytic cracking of dissimilar hydrocarbon feedstocks without commingling either the feedstocks or the products therefrom.

Another object of this invention is to provide an improved apparatus for fluidized catalytic cracking of hydrocarbon feedstocks in multiple transfer line reactors.

Another object of this invention is to provide an improved apparatus for the fluidized catalytic cracking of hydrocarbon feedstocks in multiple transfer line reactors wherein the cracked products can be commingled and sent to a single product recovery system.

Another object of this invention is to provide an improved apparatus for the fluidized catalytic cracking of gas oil feedstocks.

A further object of this invention is to provide an improved apparatus for the catalytic recracking of a heavy naphtha catalytic cracking product.

A still further object of this invention is to provide an improved fluidized catalytic cracking process.

Other objectives, aspects and advantages of the invention will be readily apparent from the following detailed description and claims.

BRIEF DESCRIPTION OF THE DRAWING

The attached drawing is a schematic representation of fluidized catalytic cracking process employing the improvement of the present invention.

DETAILED DESCRIPTION OF THE INVENTION

The apparatus of this invention is well suited for use in the fluidized catalytic cracking of dissimilar hydrocarbon feedstocks. In particular, the apparatus is especially well suited for use in carrying out the process of U.S. Pat. No. 4,067,798 to Hauschildt et al. in combination with a conventional gas oil cracking process.

The Hauschildt et al. patent, which is incorporated in its entirety by reference, is directed to an improved process for converting a specific intermediate boiling-range hydrocarbon material to more valuable products by catalytic cracking. The process comprises fractionating at least one material selected from the group consisting of a catalytic cracking product, a thermal cracking product, a reforming product, a hydrocracking product, and mixtures thereof to separate a fraction which boils in the range from about 110° C. to about 260° C. and contains at least 25 and more preferably at least 40 weight percent of mono-aromatic hydrocarbons. A feedstock comprising from 80 to 100 volume percent of this mono-aromatic containing fraction in combination with from 0 to 20 volume percent of another vaporizable hydrocarbon fraction is then subjected to catalytic cracking in a fluidized catalytic cracking zone under effective cracking conditions in the absence of any other feedstock and the resulting products are isolated without admixture with any other products. The vaporizable hydrocarbon fraction is preferably selected from the group consisting of a gas oil, cycle oil, and mixtures thereof. In addition, the mono-aromatic containing fraction is preferably derived from a catalytic cracking product.

When the apparatus of this invention is utilized in accordance with the process of U.S. Pat. No. 4,067,798 to Hauschildt et al., the cracking temperature is preferably in the range of from about 480° C. to about 650° C.; the weight-hourly space velocity is in the range of from about 2 to about 200; the catalyst-to-hydrocarbon weight ratio is in the range of from about 2 to about 25; and the cracking catalyst has a cracking activity of at least about 47 Davison units based on the modified Davison microactivity test which is described in the Oil and Gas Journal, Nov. 22, 1971, pp. 61–64. More preferably, the cracking temperature is in the range of from about 510° C. to about 595° C.; the weight-hourly space velocity is in the range of from about 2 to about 100; the catalyst-to-hydrocarbon weight ratio is in the range of from about 3 to about 15; and the cracking catalyst contains a molecular sieve or zeolite component and has a cracking activity of at least about 55 Davison units.

In such a process, a hydrocarbon product is obtained which has an increased content of low molecular weight olefins and low molecular weight mono-aromatic components, a reduced sulfur content, and a high octane rating relative to the feedstock. Octane upgrading is accomplished primarily by cracking the low octane, non-aromatic components in the feedstock to form lighter, more valuable and primarily olefinic products, with aromatic compounds, gas, and coke being secondary products. Desulfurization of the feedstock is accomplished both by cracking to form hydrogen sulfide and by concentration of the sulfur within the polycyclic aromatic fraction of the product which is not conventionally employed as a gasoline component. Due to the desulfurization and octane improvement achieved by this process, the resulting product is of such high quality that it can be used directly to make premium gasoline without further processing.

Conversion of a selected hydrocarbon feedstock in a conventional fluidized catalytic cracking process is effected by contact with a cracking catalyst, preferably in one or more fluidized transfer line reactors, at conversion temperature and at a fluidizing velocity which limits the conversion time to not more than about ten seconds. Conversion temperatures are desirably in the range from about 430° to about 700° C., preferably from about 450° to about 650° C., and most preferably from about 450° to about 565° C. Reactor effluent, comprising hydrocarbon vapors and cracking catalyst containing a deactivating quantity of carbonaceous material or coke, is then transferred to a separation zone. Hydrocarbon vapors are then separated from spent cracking catalyst and the catalyst stripped of volatile deposits in a stripping zone before regeneration. The stripping zone can be suitably maintained at a temperature in the range from about 430° to about 700° C., preferably from about 450° to about 650° C., and most preferably from about 450° to about 565° C. The preferred stripping gas is steam, although inert gases, such as nitrogen or flue gases, or mixtures of steam with inert gases can also be used. The stripping zone is maintained at a pressure in the range from about 0.4 to about 3.5 kg/cm$^2$ above atmospheric pressure, and the stripping gas is introduced in an amount which is sufficient to displace entrained hydrocarbon vapors from deactivated cracking catalyst. When steam is employed as the stripping gas, the weight ratio of stripping steam to cracking catalyst is in the range from about 0.0005 to about 0.025 and preferably in the range from about 0.0015 to about 0.0125.

In a fluidized catalytic cracking process catalyst regeneration is accomplished by burning the coke deposits from the catalyst surfaces in a regeneration zone with an oxygen containing gas such as air. Any conventional regeneration technique can be employed, including that which is set forth in U.S. Pat. No. 3,909,392 to Horecky et al. The regeneration zone temperatures are ordinarily in the range from about 565° to about 815° C. and are preferably in the range from about 620° to about 735° C. When air is used as the regeneration gas, it enters the regenerator from a blower or compressor and a fluidizing velocity in the range from about 0.05 to about 8.0 meters per second, preferably from about 0.05 to about 1.5 meters per second and more preferably from about 0.15 to about 0.90 meters per second is maintained in the regenerator. Regenerated catalyst is then recycled to the transfer line reactor for further use in the conversion of hydrocarbon feedstock.

In the usual case where a gas oil feedstock is employed in a conventional fluidized catalytic cracking process, the throughput ratio (TPR), or volume ratio of total feed to fresh feed, can vary from about 1.0 to about 3.0. Conversion level can vary from about 40% to about 100% where conversion is here defined as the percentage reduction of hydrocarbons boiling above 221° C. at atmospheric pressure by formation of lighter materials or coke. The weight ratio of catalyst to oil in the reactor can vary within the range from about 2 to about 25 so that the fluidized dispersion will have a density in the range from about 16 to about 320 kilograms per cubic meter. Fluidizing velocity can be in the range from about 3.0 to about 30 meters per second. This cracking process is preferably effected in a transfer line reactor wherein the ratio of length to average diameter is at least about 25.

Suitable hydrocarbon feedstocks for use in a conventional fluidized catalytic cracking process include, but are not limited to, petroleum fractions such as light gas oils, heavy gas oils, wide-cut gas oils, vacuum gas oils, naphthas, decanted oils, residual fractions and cycle oils derived from any of these as well as hydrocarbon fractions derived from shale oils, tar sands processing, synthetic oils, coal liquefaction and the like. Any of these suitable feedstocks can be employed either singly or in any desired combination.

Conventional hydrocarbon cracking catalysts include those of the amorphous silica-alumina type having an alumina content of about 10 to about 30 weight percent. Catalysts of the silica-magnesia type are also suitable which have a magnesia content of about 20 weight percent. Preferred catalysts include those of the zeolite-type which comprise from about 0.5 to about 50 weight percent and preferably from about 1 to about 30 weight percent of a crystalline aluminosilicate component distributed throughout a porous matrix. Zeolite-type cracking catalysts are preferred because of their thermal stability and high catalytic activity.

The crystalline aluminosilicate or zeolite component of the zeolite-type cracking catalyst can be of any type or combination of types, natural or synthetic, which is known to be useful in catalyzing the cracking of hydrocarbons. Suitable zeolites include both naturally occurring and synthetic aluminosilicate materials such as faujasite, chabazite, mordenite, Zeolite X (U.S. Pat. No. 2,882,244), Zeolite Y (U.S. Pat. No. 3,130,007) and ultrastable large-pore zeolites (U.S. Pat. Nos. 3,293,192 and 3,449,070). The crystalline aluminosilicates having a faujasite-type crystal structure are particularly suitable and include natural faujasite, Zeolite X and Zeolite Y. These zeolites are usually prepared or occur naturally in the sodium form. The presence of this sodium is undesirable, however, since the sodium zeolites have a low catalytic activity and also a low stability at elevated temperatures in the presence of steam. Consequently, the sodium content of the zeolite is ordinarily reduced to the smallest possible value, generally less than about 1.0 weight percent and preferably below about 0.3 weight percent through ion exchange with hydrogen ions, hydrogen-precursors such as ammonium ion, or polyvalent metal cations including calcium, magnesium, strontium, barium and the rare earth metals such a cerium, lanthanum, neodymium and their mixtures. Suitable zeolites are also able to maintain their pore structure under the high temperature conditions of catalyst manufacture, hydrocarbon processing and catalyst regeneration. These materials have a uniform pore structure of exceedingly small size, the cross-section diameter of the pores being in the range from about 4 to about 20 angstroms, preferably from about 8 to about 15 angstroms.

The matrix of the zeolite-type cracking catalyst is a porous refractory material within which the zeolite component is dispersed. Suitable matrix materials can be either synthetic or naturally occurring and include, but are not limited to, silica, alumina, magnesia, boria, bauxite, titania, natural and treated clays, kieselguhr, diatomaceous earth, kaoline and mullite. Mixtures of two or more of these materials are also suitable. Particularly suitable matrix materials comprise mixtures of silica and alumina, mixtures of silica with alumina and magnesia, and also mixtures of silica and alumina in combination with natural clays and clay-like materials. Mixtures of silica and alumina are preferred, however, and contain preferably from about 10 to about 65 weight percent of alumina mixed with from about 35 to about 90 weight percent of silica.

The present invention can be best understood by reference to the attached drawing. It will be understood, however, that the invention is not limited to the embodiment shown and that the invention includes alternatives and equivalents which are within the scope of the appended claims.

The apparatus of this invention is conveniently described by reference to the two basic modes of operation for which it is particularly well suited. The first basic mode of operation involves the simultaneous fluidized catalytic cracking of dissimilar hydrocarbon feedstocks without commingling either the feedstocks or the products therefrom. A gas oil feedstock having a boiling range of from 345° to 565° C. from line 1 is contacted with hot regenerated catalyst from line 2 in the inlet portion of transfer line reactor 3. The resulting mixture of catalyst and hydrocarbon vapor passes upward through transfer line reactor 3, and the gas oil undergoes catalytic cracking during passage through transfer line reactor 3. Transfer line reactor 3 terminates in a downward directed discharge head 4 which is located within reactor vessel 5. The upper surface 6 of the dense phase of catalyst particles within vessel 5 is generally maintained below discharge head 4, thereby allowing hydrocarbon vapors to disengage from the catalyst particles without substantial contact with the dense phase. However, if desired, the location of catalyst phase interface 6 may be varied from a position below discharge head 4 to a position above discharge head 4. In the latter case, increased catalytic conversion of the gas oil feedstock will occur as a consequence of additional cracking taking place within the dense phase bed of catalyst in reactor vessel 5.

Vapors and entrained catalyst particles passing upward through reactor vessel 5 enter primary cyclone separator 7. Most of the entrained catalyst particles are separated in the first stage cyclone 7 and are discharged downwardly through dip-leg 8 and into the dense phase bed of catalyst within reactor vessel 5. Vapors and remaining catalyst particles are passed through interstage cyclone line 9 to second stage cyclone separator 10 where substantially all of the remaining catalyst is separated and passed downwardly through dip-leg 11 and into the dense phase bed of catalyst within reactor vessel 5.

Effluent vapors pass from cyclone 10, through line 12, into plenum chamber 13, and are discharged through line 14. Line 14 conveys the effluent vapors to a gas oil product recovery zone, not shown, wherein the vapors are separated into product fractions by methods which are well known in the art.

A naphtha feedstock having a boiling range of from 110° to 260° C. and containing about 40 weight percent of mono-aromatic hydrocarbons is introduced into the inlet portion of transfer line reactor 15 through line 16 and is contacted with hot regenerated catalyst from line 17. In a preferred method of operation, the naphtha feedstock passed through line 16 is a gas oil catalytic cracking product and is derived from the gas oil product recovery zone which is employed to recover the hydrocarbon products which are discharged from line 14. The resulting mixture of catalyst and hydrocarbon vapors passes upward through transfer line reactor 15 and the naphtha feedstock undergoes catalytic cracking during passage through transfer line reactor 15. It will be appreciated, of course, that the temperature and other process conditions within transfer line reactor 15 can be controlled independently from those within transfer line reactor 3. A mixture of coked or spent catalyst, hydrocarbon products, and unconverted naphtha is passed from the top section of transfer line reactor 15 into horizontal exit line 18, positioned slightly below the top of transfer line reactor 15 where a pocket of spent catalyst occupies dead space 19 to provide a cushioning effect and minimize erosion.

The fluidized effluent mixture from transfer line reactor 15 passes through exit line 18 and is directly discharged into cyclone separator 20 which is contained in the upper portion of reactor vessel 5 and is directly connected to exit line 18. The spend catalyst is separated in cyclone separator 20 and is discharged downwardly through dip-leg 21 and into the dense phase bed of catalyst within vessel 5. Effluent hydrocarbon vapors pass from cyclone separator 20, through exit line 22, through valve 23, and are discharged through line 24. It will be appreciated, of course, that an unsubstantial amount, generally less than about 5%, of the effluent hydrocarbon vapors from transfer line reactor 15 will be discharged downwardly through dip-leg 21 together with spent catalyst. Although not shown, additional stages of cyclone separators can be installed between cyclone separator 20 and exit line 22. Line 24 conveys the effluent vapors to a naphtha product recovery zone, not shown, where the vapors are separated into product fractions by methods which are well known in the art. This naphtha product recovery zone is separate from the gas oil product recovery zone which is employed to recover the gas oil products which are discharged through line 14. Valve 25 is closed, thereby preventing any commingling of gas oil products from line 14 with naphtha products from exit line 22.

Catalyst particles from the dense phase bed in the lower portion of reactor vessel 5 pass downwardly into stripping zone 26. Baffles 27 are situated in stripping zone 26, and steam from line 28 is discharged through steam ring 29 into the lower portion of stripping zone 26. Steam rising through the stripping zone 26 removes volatile hydrocarbons from the catalyst particles and serves to fluidize the catalyst in the stripping zone 26 and in the dense phase bed within reactor vessel 5.

Stripped spent catalyst is withdrawn from the bottom of stripping zone 26 through spend catalyst standpipe 30 at a rate controlled by valve 31, and discharges through line 32 into spent catalyst transfer line 33. Spent catalyst from line 32 is fluidized with air from line 34 and passes upwardly through transfer line 33 and into regenerator vessel 35. Transfer line 33 terminates in a downwardly directed discharge head 36, and effluent from transfer line 33 is discharged below the surface 37 of the dense phase of fluidized catalyst particles in the regenerator vessel 35. Catalyst within the regenerator vessel 35 is fluidized by combustion air from line 38 which is discharged through air ring 39, whereupon the coke deposits on the spent catalyst are burned and the catalytic activity of the spent catalyst is restored. Combustion gases continuously pass upwardly from the dense catalyst phase into the dilute phase above the catalyst interface 37. These combustion gases, together with entrained catalyst particles, enter primary cyclone separator 40. Most of the entrained catalyst particles are separated in the first stage cyclone 40 and are discharged downwardly through dip-leg 41 and into the dense catalyst phase within regenerator vessel 35. Combustion gases and remaining catalyst particles are passed through interstage cyclone line 42 to second stage cyclone separator 43 where substantially all of the remaining catalyst is separated and passed downwardly through dip-leg 44 and into the dense catalyst phase within regenerator vessel 35. Effluent gases from cyclone separator 43 pass through line 44, into plenum 45, and are discharged from regenerator vessel 35 through line 46. Effluent combustion gases from line 46 can be discharged directly to the atmosphere or, alternatively, can be passed through conventional particulate control equipment and conventional heat exchange means prior to such discharge into the atmosphere. If desired, the effluent gases can also be passed through an expander turbine prior to discharge into the atmosphere.

Regenerated catalyst having a low content of residual coke is withdrawn from the bottom of regenerator vessel 35 through standpipe 47 at a rate controlled by valve 48 to supply hot regenerated catalyst to line 2 which is described above. Similarly, regenerated catalyst having a low content of residual coke is withdrawn from the bottom of regenerator vessel 35 through standpipe 49 at a rate controlled by valve 50 to supply hot regenerated catalyst to line 17 which is described above.

The second basic mode of operation for which the apparatus of this invention is particularly well suited involves the use of transfer line reactor 15 for the fluidized catalytic cracking of either a cycle oil or a feedstock which is substantially identical with that which is charged to transfer line reactor 3. In one embodiment of this second mode of operation, a gas oil feedstock is simultaneously charged to transfer line reactors 3 and 15 through lines 1 and 16, respectively. In addition, valve 23 is closed and valve 25 is open, whereby hydrocarbon products from transfer line reactors 3 and 15 can be commingled and sent to the gas oil product recovery zone through line 14.

The suitability of the apparatus of this invention for use in the above described two basic modes of operation provides a valuable flexibility. During periods in which refinery octane and product quality needs are satisfied by the catalytic cracking of gas oil alone, a gas oil feedstock can be simultaneously charged to transfer line reactors 3 and 15. When gas oil cracking alone does not satisfy the refinery octane and product quality needs, a naphtha feedstock can be charged to transfer line reactor 15 through line 16 and a gas oil feedstock can be separately charged to transfer line 3 through line 1, as described above.

When transfer line reactors 3 and 15 are both employed for the catalytic cracking of a gas oil feedstock, the apparatus of this invention permits an optimization of product composition which can not be achieved through the use of a single transfer line reactor alone. Since the cracking conditions, such as temperature and space velocity, in transfer line reactors 3 and 15 can be independently controlled, it is possible to separately adjust the product composition from each transfer line reactor in such a manner that the composition of the commingled product mixture is precisely tailored to meet downstream process requirements. By way of example, transfer line reactor 15 can be used to produce high olefin yields by cracking the gas oil at high temperatures and high space velocities, whereas transfer line reactor 3 can be operated at a lower temperature and lower space velocities to produce lower olefin yields and larger amounts of isobutane for use in alkylation processes.

In the embodiment of this invention which is illustrated by the drawing, transfer line reactor 15 is external to reactor vessel 5 and is substantially vertical in orientation. It will be appreciated, however, that transfer line reactor 15 can be at least partially enclosed by reactor vessel 5 if desired. In addition, transfer line reactor 15 can be at least partially sloping or curved. It will also be appreciated that transfer line reactor 3 can be substantially vertical rather than partially curved as shown in the drawing and can also be completely external to reactor vessel 5. In a preferred embodiment of the apparatus of this invention, the transfer line reactors are substantially vertical. The contacting of catalyst and oil is generally more satisfactory in a substantially vertical transfer line reactor as a result of reduced catalyst slippage. Consequently, somewhat improved product yields can frequently be obtained through the use of a substantially vertical transfer line reactor.

These are two critical requirements of the cyclone separation system which is associated with transfer line reactor 15. The first requirement is that this cyclone separation system must be directly connected by an inlet means to the upper end of transfer line reactor 15 in order to substantially prevent the discharge of hydrocarbon products from transfer line reactor into reactor vessel 5 and thereby prevent the commingling of hydrocarbon products from the two transfer line reactors 3 and 15. This is an essential requirement when transfer line reactor 15 is utilized for the isolated catalytic cracking of a naphtha in accordance with the process of Hauschildt et al., U.S. Pat. No. 4,067,798. The second critical requirement of the cyclone separation system which is associated with transfer line reactor 15 is that it must be located within the reactor vessel 5. This internal location results in three significant advantages.

The first advantage of an internal location for the cyclone system is that the cyclones can be constructed more simply and at lesser expense. This is because a cyclone must be constructed to withstand the pressure differential between its interior and exterior walls, and a cyclone which is external to reactor vessel 5 must be constructed to withstand a greater pressure differential than an internal cyclone. By way of example, if the pressure within the cyclone is 2.8 kg/cm$^2$ above atmospheric pressure and the pressure in reactor vessel 5 is 0.7 kg/cm$^2$ above atmospheric pressure, an internal cyclone must be built to withstand a pressure differential of 2.1 kg/cm$^2$ while an external cyclone must be built to withstand a larger pressure differential of 2.8 kg/cm$^2$.

The second advantage of an internal location for the cyclone system is that the cyclone dip-legs can conveniently have a substantially vertical orientation, thereby decreasing the possibility of erosion damage by the downwardly flowing catalyst particles. Flowing catalyst particles are very abrasive and can cause severe damage to exposed surfaces over a period of time. When a cyclone dip-leg is positioned at a significant angle from vertical, the downwardly flowing catalyst tends to cause a relatively rapid erosion of the lower interior surface of the dip-leg. When the dip-leg has a substantially vertical orientation, erosion damage to the interior walls of the dip-leg by downwardly flowing catalyst particles is minimized.

The third advantage of an internal location for the cyclone system accrues if an opening develops in a cyclone dip-leg as a consequence of erosion damage by the downwardly flowing catalyst particles. If such an opening were to develop in some portion of a dip-leg which is external to reactor vessel 5, catalyst and vapors would escape through the opening and require an immediate shutdown of the catalytic cracking unit. In contrast, if an opening develops in the wall of a dip-leg which is within reactor vessel 5, the catalytic cracking unit can continue to operate without great difficulty until can be conveniently shut down for repairs.

We claim:

1. In a fluidized catalytic cracking system comprising in combination a spent catalyst stripper, a spent catalyst regenerator, and multiple reactors, apparatus for the fluidized catalytic cracking of hydrocarbon feedstocks in multiple reactors comprising:
  (a) a first elongated transfer line reactor which is adapted for the fluidized catalytic cracking of hydrocarbon feedstock, having an upper and lower end, said lower end having both a regenerated catalyst inlet means and a hydrocarbon feedstock inlet means;
  (b) a reactor vessel communicating with and enclosing the upper end of said first transfer line reactor;
  (c) an outlet means for removing spent catalyst from the lower portions of said vessel;
  (d) a first cyclone separation system located within said vessel and adapted to separate catalyst particles from vapors, which comprises at least one cyclone gas-solids separation means having a dip-leg depending therefrom;
  (e) a vapor outlet means connected to said first cyclone separation system;
  (f) a second elongated transfer line reactor which is adapted for the fluidized catalytic cracking of hydrocarbon feedstock, having an upper and lower end, said lower end having both a regenerated catalyst inlet means and a hydrocarbon feedstock inlet means;
  (g) a separate conduit leading to each hydrocarbon feedstock inlet means, whereby the same or different feedstocks can be conveyed to each transfer line reactor;
  (h) a second cyclone separation system located within said vessel, directly connected by an inlet means to the upper end of said second transfer line reactor, and adapted to separate the mixture of catalyst particles and vapors which is discharged from said second transfer line reactor, wherein said second cyclone separation system comprises at least one cyclone gas-solids separation means having a dip-leg depending therefrom, and whereby the vapors from said second transfer line reactor are substantially separated and prevented from entering said vessel and catalyst from the second transfer line reactor is separated and passed into said vessel;

(i) a vapor outlet means connected to the second cyclone separation system; and (j) a separate conduit leading from the vapor outlet means associated with each cyclone separation system, whereby the vapors from each vapor outlet means can be conveyed to a separate product recovery system.

2. The apparatus of claim 1 additionally comprising a transfer means communicating between the conduits leading from the vapor outlets means associated with each cyclone separation system, said transfer means comprising at least one valve means, whereby the vapors from said first and second cyclone separation systems can be commingled and sent to a single product recovery system if desired.

3. The apparatus of claim 1 or 2 wherein a major portion of said first transfer line reactor is substantially vertical.

4. The apparatus of claim 1 or 2 wherein a major portion of said second transfer line reactor is substantially vertical.

5. The apparatus of claim 1 or 2 wherein the dip-legs are substantially vertical.

6. The apparatus of claim 1 or 2 wherein a major portion of said second transfer line reactor is substantially external to said vessel.

7. A process for the fluidized catalytic cracking of hydrocarbon feedstocks in multiple reactors which comprises:

(a) passing a fluidized mixture of catalyst particles and a first hydrocarbon feedstock upwardly through a first elongated transfer line reactor under effective cracking conditions, whereby catalytic cracking of said first hydrocarbon feedstock is effected;

(b) passing a fluidized mixture comprising catalyst particles and hydrocarbon vapors, including cracked hydrocarbon products, from said first transfer line reactor to a reactor vessel communicating with and enclosing the upper end of said first transfer line reactor;

(c) passing hydrocarbon vapors and entrained catalyst particles from said vessel to a first cyclone separation system located within said vessel and adapted to separate catalyst particles from vapors, which comprises at least one cyclone gas-solids separation means having a dip-leg depending therefrom whereby entrained catalyst particles are separated from the vapors and returned to said vessel;

(d) passing said vapors from said first cyclone separation system to a product recovery zone;

(e) passing a fluidized mixture of catalyst particles and a second hydrocarbon feedstock upwardly through a second elongated transfer line reactor under effective cracking conditions, whereby catalytic cracking of the second hydrocarbon feedstock is effected, and wherein said first and second hydrocarbon feedstocks are the same or different;

(f) passing a fluidized mixture comprising catalyst particles and hydrocarbon vapors, including cracked hydrocarbon products, from an upper portion of said second transfer line reactor to a second cyclone separation system located within said vessel, directly connected by an inlet means to the upper end of said second transfer line reactor, and adapted to separate the mixture of catalyst particles and vapors which is discharged from said second transfer line reactor, wherein said second cyclone separation system comprises at least one cyclone gas-solids separation means having a dip-leg depending therefrom, and whereby the vapors from said second transfer line reactor are substantially separated and prevented from entering said vessel and catalyst from the second transfer line reactor is separated and passed into said vessel; and (g) passing said vapors from said second cyclone separation system to said product recovery zone and recovering therein cracked hydrocarbon products from said vessel and said second transfer line reactor.

8. The process as set forth in claim 7 wherein catalyst particles from said vessel are passed to a stripping zone wherein volatile deposits are stripped from the catalyst particles with a stripping gas and stripped volatile deposits are passed to said first cyclone separation system and then to said product recovery zone.

9. The process as set forth in claim 7 wherein said first hydrocarbon feedstock comprises a gas oil.

10. The process as set forth in claim 9 wherein said second hydrocarbon feedstock comprises a gas oil.

11. A process for the fluidized catalytic cracking of hydrocarbon feedstocks in multiple reactors which comprises:

(a) passing a fluidized mixture of catalyst particles and heavy hydrocarbon feedstock upwardly through a first elongated transfer line reactor under effective cracking conditions, whereby catalytic cracking of the heavy hydrocarbon feedstock is effected;

(b) passing a fluidized mixture comprising catalyst particles and hydrocarbon vapors, including cracked hydrocarbon products, from said first transfer line reactor to a reactor vessel communicating with and enclosing the upper end of said first transfer line reactor;

(c) passing hydrocarbon vapors and entrained catalyst particles from said vessel to a first cyclone separation system located within said vessel and adapted to separate catalyst particles from vapors, which comprises at least one cyclone gas-solids separation means having a dip-leg depending therefrom whereby entrained catalyst particles are separated from the vapors and returned to said vessel;

(d) passing said vapors from said first cyclone separation system to a first product recovery zone and recovering a hydrocarbon fraction comprising at least 25 weight percent mono-aromatic hydrocarbons and boiling in the range from about 110° to about 260° C.;

(e) passing a fluidized mixture of catalyst particles and a naphtha feedstock upwardly through a second elongated transfer line reactor under effective cracking conditions, whereby catalytic cracking of the naphtha feedstock is effected, and wherein said naphtha feedstock comprises at least a portion of the hydrocarbon fraction from step (d) in combination with from 0 to 20 volume percent of another vaporizable hydrocarbon fraction;

(f) passing a fluidized mixture comprising catalyst particles and hydrocarbon vapors, including cracked hydrocarbon products, from an upper portion of said second transfer line reactor to a second cyclone separation system located within said vessel, directly connected by an inlet means to the upper end of said second transfer line reactor, and adapted to separate the mixture of catalyst particles and vapors which is discharged from said second transfer line reactor, wherein said second cyclone separation system comprises at least one cyclone gas-solids separation means having a dipleg depending therefrom, and whereby the vapors from said second transfer line reactor are substantially separated and prevented from entering said vessel and catalyst from the second transfer line reactor is separated and passed into said vessel; and (g) passing said vapors from said second cyclone separation system to a second product recovery zone and recovering therein cracked hydrocarbon products from said second transfer line reactor.

12. The process as set forth in claim 11 wherein catalyst particles from said vessel are passed to a stripping zone wherein volatile deposits are stripped from the catalyst particles with a stripping gas and stripped volatile deposits are passed to said first cyclone separation system and then to said first product recovery zone.

13. The process as set forth in claim 11 wherein said heavy hydrocarbon feedstock comprises a gas oil.

14. The process as set forth in claim 11 wherein said cracking catalyst comprises a zeolite component and has a cracking activity of at least about 55 Davison units.

* * * * *